Patented Feb. 20, 1934

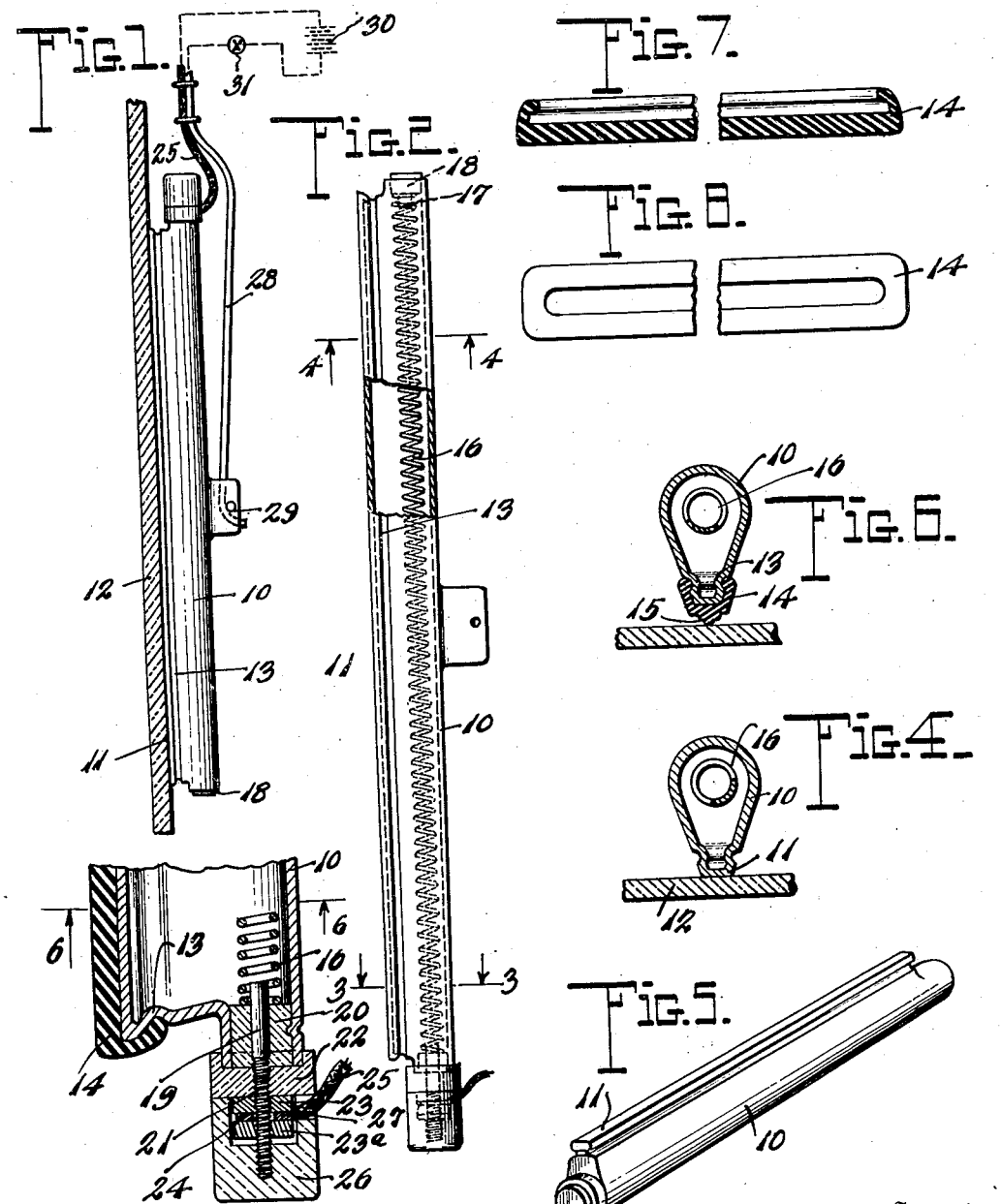

1,947,803

UNITED STATES PATENT OFFICE 1,947,803

WINDSHIELD WIPER

Edgar F. Sandman, Willoughby, Ohio

Application March 24, 1931. Serial No. 525,005

3 Claims. (Cl. 15—250)

It is well known that frequently weather conditions in many localities commonly met with especially during winter months result in added traffic hazards through accumulation of frozen moisture upon the windshields of motor vehicles, which accumulation results in interference with the vision of the operator or driver of the vehicle, since the usual wiping means employed for the removal of moisture from a windshield is of but comparatively little use when temperatures below the freezing point of water are encountered.

The present invention has for its object therefore, the provision of a windshield wiper which will prevent accumulation of frozen deposits of moisture upon a windshield, through the utilization of a heating means which maintains the area of contact between the wiper and the windshield at a temperature above the freezing point of water so as to efficiently maintain clear his field of vision. For the efficient accomplishment of this object, there is provided a windshield wiper having a heating element associated therewith, this element being so positioned that its heat will be directed by reflection and by conduction to the area of the windshield over which the wiper operates. By positioning the wiper directly against the glass of the windshield there is obtained a very efficient utilization of the heat from the heat element, and by rendering the surface of the windshield wiper smooth and in close contact with the glass, there is provided a uniform distribution of the residual film of moisture always remaining unremoved during the wiping operation, while by making the contact between the wiping surface and the glass as intimate as possible, the thickness of this residual film is reduced to an absolute minimum. It will be accordingly seen that because this residual film is always in the liquid state, is always evenly distributed over the wide area and is of infinitesimal thickness, it follows that the field of vision of the operator will never be obscured or disconcertingly blurred while the wiper with its heating element is in operation.

The wiper of this invention is further characterized by the fact that there is a circuit making and breaking means included in the heater circuit and conveniently located within easy reach of the operator of the vehicle, so that the heating element may be selectively put into and out of operation, as desired; and further, the wiper itself is characterized by the fact that the body of the wiper is so constructed that when the heating element is not to be employed, an additional resilient wiping member may be slipped over the wiping surface of the body of the wiping apparatus, so that when desired a resilient surface may be applied to the glass for wiping purposes. This feature adds greatly to the convenience of the device because only when the temperature is below freezing is the use of the heating element desirable, and the use of the resilient wiping member when the heater is not being employed serves as a cushion for the wiper and prevents undue wear on either the flat metallic wiping surface or the glass upon which the wiper operates. It will be understood that this resilient wiping member may be as readily detached from the body of the wiper as it is attached to it so that whenever it is desired to utilize the metallic wiper in direct contact with the glass it is only necessary to slip off the resilient member and to slip this member back in place again when it is desired to use it.

The invention will be more readily understood by reference to the accompanying drawing and the detailed description thereof, which is hereinafter fully set forth, in which drawing—

Figure 1 represents the wiper of this invention in side elevation directly applied to a windshield, which is shown in section.

Figure 2 is a detailed elevational view of the novel wiper, showing the construction thereof, parts of the wiper being shown in section for purposes of clarity.

Figure 3 is a fragmentary sectional view through one end of the wiper, starting at the line 3—3 of Figure 2 and looking in the direction of the arrows, but showing further a resilient wiping element applied to the body of the wiper.

Figure 4 is a sectional view taken on the line 4—4 of Figure 2, looking in the direction of the arrows.

Figure 5 is a perspective view of the wiper of Figures 1 and 2, and showing the flat metallic wiping surface employed for intimate and direct contact with the glass of the wiper.

Figure 6 is a sectional view on the line 6—6 of Figure 3, looking in the direction of the arrows.

Figure 7 is a fragmentary sectional view of a resilient wiping member adapted to be attached to the wiper of Figures 1, 2, and 4, parts being broken away, and—

Figure 8 is a top plan view of such a resilient wiping element.

Referring more particularly to the drawing, the body of the wiper is shown at 10, this being desirably of a good heat conducting material such as metal, and being hollow and oval in cross section as will be clearly shown in Figures 4, 5, and 6. The underside of the wiping body 10 is formed of a very smooth flat surface 11 adapted to intimately engage at all points with the glass of a windshield 12.

Extending around the body 10 of the wiper and adjacent the wiping surface 11 thereof is a peripheral groove 13 adapted to receive, when desired, a cushioning resilient wiping member 14 conveniently of rubber, and formed with a thickened wiping surface 15. This resilient member 14 is simply slipped in place within the groove 13 and so held there until its removal is desired, when it is simply slipped off.

Disposed within the body 10 of the wiper is a heating element 16, conveniently formed of a suitable material of high electric resistance, such as the well known microhm resistance material, for example, which is, as is well known, a nickel chromium alloy widely used in the production of heating units. This heating element 16 is secured at one end in position on a stud 17 which carries the heating element 16 in any desired manner, the stud 17 being in turn carried by a plug 18 of suitable material acting as a closure for the end of the wiper. At the other end the element 16 is secured in position by a stud 19 passing through an insulating plug 20 fitted within the end of the wiper body 10 by removal therefrom to permit access to the interior of the body 10 whenever desired. The stud 19 is of conductive material and serves as the lead-in conductor for supplying current to the heating element 16.

As will be seen from the drawing, it is found convenient to surround the projecting portion of the stud 19 and the end of the wiper body 10 with protecting means, and for this purpose it is convenient to provide the member 19 with threads along at least a portion thereof, as indicated at 21, and placing over a part of this projecting member and end of the body 10, a cap 22, desirably of resilient insulating material such as rubber, or bakelite, and then threading upon the threads 21, the metallic washers 23 and 23a between which washers there is placed the conducting tap 24 connected to the flexible lead-in cable 25.

For protection the entire assemblage is covered by a resilient cap 26 of rubber or other protective insulating material, which is grooved at 27 for the reception of the lead-in cable 25. The plug 18 at the other end of the wiper body 10, being conductive, the circuit is completed through the body 10 and supporting member 28 which carries the wiper 10 and which is secured thereto as indicated at 29. Current for the actuation of the heating unit 16 is supplied from the battery 30, there being a switch 31 conveniently located within the circuit to control the actuation of the heating element. This switch 31 may conveniently be mounted upon the dashboard or instrument panel within easy reach of the driver.

When there is danger of moisture collecting and freezing upon the windshield 12 the heating unit 16 is energized and by virtue of the oval configuration of the body 10 and its heat conducting properties, the heat from the heating element 16 is efficiently conducted to the flat surface 11, which is, as has been said before, in very close and intimate contact throughout its area directly against the glass of the windshield 12 so that as the wiping body 10 moves over the glass, the glass will become warmed above the melting point of ice so that freezing thereof will be prevented; and because of the smoothness of the surface 11 and the close engagement thereof with the windshield 12, the residual film of moisture will be very thin and very evenly distributed so as to prevent blurring or obstructing the vision of the driver of the vehicle.

Obviously, it will not be necessary to continuously utilize the heating element 16 and when this element is not being utilized it will be desirable to provide a resilient cushioning wiping surface in contact with the glass instead of the smooth metallic surface 11. The member 28 which carries the wiper 10 is therefore made yielding so that the ready attachment of the wiping element 14 to the body 10 may be effected, it being understood that this wiping element 14 is merely slipped on and off the body 10 of the wiper as desired, it being shaped so as to readily slip into the groove 13 to be held in position while attached to the wiper.

It will be understood, of course, that it is intended to use this member 14 only when the use of the heating element is not contemplated.

It will therefore be apparent that this invention provides a construction which very efficiently utilizes the heat of the heating element and it is extremely simple and sturdy in construction. It will be apparent that various changes in the details of the construction herein specifically illustrated and described may be made without departing from the inventive concept, which changes will readily suggest themselves to one skilled in this art; it will accordingly be understood that it is intended and desired to embrace within the scope of this invention such modifications and changes as may be necessary to adapt it to varying conditions and uses.

Having thus described my invention, what I claim as new and desire to secure by Letters Patent of the United States, is—

1. A windshield wiper comprising an elongated heat conducting body having an extension projecting longitudinally thereof terminating in a flat heating and wiping surface and constituting a support, the extension having an external groove extending peripherally therearound for detachably receiving in position a wiping member, intermediate the heating surface and the windshield, the said flat surface of the extension being adapted to closely engage the windshield when the wiper is removed 2. A windshield wiper or the like, comprising an elongated heater member constituting a supporting member having an extension projecting laterally therefrom and longitudinally therealong, said extension being provided with a flat heating and wiping surface and having means thereon for receiving a resilient wiping shoe readily attachable to and detachable from the said support at will to extend intermediate the said heater member and the windshield.

3. A windshield wiper or the like, comprising a heater member enclosed in a hollow body having a flat heating and wiping surface normally engageable with the windshield and constituting a support, said hollow body having means thereon for detachably receiving a resilient wiping shoe for support by the heater member intermediate the flat surface and the windshield.

EDGAR F. SANDMAN.